United States Patent [19]

Hori

[11] Patent Number: 4,899,194

[45] Date of Patent: Feb. 6, 1990

[54] METHOD OF AND DEVICE FOR DETECTING IMAGE

[75] Inventor: Hisamitsu Hori, Kanagawa, Japan

[73] Assignee: Fuji Photo Film Co., Ltd., Kanagawa, Japan

[21] Appl. No.: 274,544

[22] Filed: Nov. 22, 1988

[30] Foreign Application Priority Data

Nov. 24, 1987 [JP] Japan .................................. 62-293960
Jan. 14, 1988 [JP] Japan .................................. 63-004659

[51] Int. Cl.$^4$ ............................................. G03B 27/34
[52] U.S. Cl. ........................................ 355/56; 250/201; 358/227
[58] Field of Search ....................... 355/56; 353/26 A; 358/227; 250/201 AF, 201 PF, 578, 571

[56] References Cited

U.S. PATENT DOCUMENTS 4,762,985 8/1988 Imai et al. .......................... 356/444 X
4,837,450 6/1989 Satomura et al. .............. 356/444 X

*Primary Examiner*—L. T. Hix
*Assistant Examiner*—D. Rutledge
*Attorney, Agent, or Firm*—Sughrue, Mion, Zinn, Macpeak & Seas

[57] ABSTRACT

A method of and device for detecting an image relevant for subsequent auto-focusing operation, wherein one focus zone is scanned by an image sensor and a histogram for the one focus zone is made. The presence or absence of an image in the one focus zone is judged on the basis of the profile of the histogram. The basis for judgment is the distribution range of the frequencies in the histogram according to the first aspect, and the height of the maximum peak of the histogram curve according to the second aspect. When it is judged that an image relevant for auto-focusing operation is not present in the one focus zone, a binarization level is set from the histogram for the one focus zone. Another focus zone is then scanned and the output signals from the image sensor are binarized by a real-time operation using the binarization level set from the histogram for the one focus zone to know the reversing number of which the image signals of another focus zone change from a value under/over the binarization level to a value over/under the binarization level. The reversing number is compared with a programmed number to judge whether or not an image is present in the another focus zone.

10 Claims, 11 Drawing Sheets

METHOD OF AND DEVICE FOR DETECTING IMAGE

BACKGROUND OF THE INVENTION

1. Field of the Invention

The present invention relates to a method of and device for detecting an image in an auto-focusing apparatus in which focusing condition is judged by using an image sensor, such as a CCD line sensor.

Various auto-focusing methods have been proposed, in which a CCD line sensor or like image sensor is used to detect an image. In order to ensure proper auto-focusing operation, an image zone relevant for auto-focusing operation should be projected so that the image sensor receives the light projecting through the such image zone. For instance, if an image zone having a monotoneous brightness or a substantially constant density is projected to be sensed by the image sensor, precise auto-focusing operation cannot be performed leading to erroneous operation. Accordingly, prior to performing auto-focusing operation, it becomes necessary to judge whether or not the image zone sensed by the image sensor is a zone relevant for auto-focusing operation.

2. Prior Art Statement

One known method of judging whether or not the image zone sensed by the image sensor is a zone relevant for auto-focusing operation or not is the method wherein the output signal from the image sensor is binarized (bilevel coded) by a predetermined threshold level to know the reversing number indicating the number of times for the image signal to be changed from a value under/over the threshold level to a value over/under the threshold level (in other words, the number of times for the sensed image zone to be changed from black to white or white to black), and it is judged that an image is present in the sensed image zone when the reversing number is more than a programmed number. However, in this known method, it becomes necessary to determine the density of the background, since the threshold level for binarization must be shifted depending on the density of the background and also depending on whether the original is a negative or positive picture.

Another known method involves the steps of pre-scanning the entire area of the original to make a histogram, and determining the density of the background by referring to the histogram. However, this known method is detrimental in that the time costed for the pre-scanning operation is redundantly long since the entire area of the original image must be pre-scanned for making the histogram. Although it is expected to save the time for pre-scanning by decreasing the area to be pre-scanned, the accuracy in determination of background density is lowered.

The accuracy is seriously lowered particularly when the background density is determined by pre-scanning an image zone having a relatively high density, e.g. an image zone containing a row of letters, and the slice level (threshold level) for binarization is set by referring to the thus determined background density.

OBJECTS AND SUMMARY OF THE INVENTION

Accordingly, a first object of this invention is to provide a method of detecting an image in an auto-focusing apparatus for judging precisely and rapidly the presence or absence of an image in the sensed image zone by using image signals of relatively small area, even when the density of the background of the original is fluctuated or even when it is unknown whether the original is a negative film or a positive film.

A second object of this invention is to provide an image detecting device to be assembled in an auto-focusing apparatus for performing such a method as described in the preceding paragraph.

The first object of this invention is achieved in the method of detecting an image in an auto-focusing apparatus in which a projection lens is controlled to focus the image by scanning the light projecting through the original image with an image sensor and by utilizing the image signals generated from said image sensor, an improvement which comprises:

(a) the step of making a histogram which represents the number of picture elements in relation of the image signal values sensed by said image sensor in one focus zone;

(b) the step of judging whether or not an image is present in said one focus zone on the basis of a profile of said histogram;

(c) the step of setting a binarization level using said histogram when it is judged that no image is present at the preceding step (b);

(d) the step of counting the reversing number N of which the image signals of another focus zone change from a value under/over said binarization level to a value over/under said binarization level; and (e) the step of judging that an image is present in said another focus zone when the image reversing number N counted at the preceding step (d) is more than a programmed number M.

The second object of this invention is achieved by the provision of an image detecting device to be assembled in an auto-focusing apparatus in which a projection lens is controlled to focus the image by scanning the light projecting through the original image with an image sensor and by utilizing the image signals generated from said image sensor, an improved image detecting device which comprises:

(a) histogram means for making a histogram which represents the number of picture elements in relation of the image signal value sensed by said image sensor in one focus zone;

(b) discriminator means for judging the presence or absence of an image in said one focus zone on the basis of a profile of said histogram;

(c) focus zone shifting means for shifting the focus zone from said one focus zone to another focus zone when said discriminator means judges that no image is present;

(d) binarization level setting means for setting a binarization level using said histogram;

(e) reversing number counting means for counting the reversing number N of which the image signals of another focus zone change from a value under-/over said binarization level to a value over/under said binarization level; and (f) comparator means for comparing said reversing number N with a programmed number N; said image detecting device judging that an image is present when said reversing number N is more than said programmed number N.

DESCRIPTION OF THE DRAWINGS

The above and other objects and advantages of this invention will be apparent from the following detailed description of the presently preferred embodiments with reference to the appended drawings, in which:

FIG. 4-N is a chart showing the wave form of output from the image sensor when the original is a negative film;

FIG. 4-P is a chart showing the wave form of output from the image sensor when the original is a positive film;

FIG. 5-N1 is a chart showing the wave form of output from the image sensor and FIGS. 5-N2 and 5-N3 are charts showing the histograms when the original is a negative film. These Figures are given for explaining the principle of the invention;

FIG. 5-P1 is a chart showing the wave form of output from the image sensor and FIGS. 5-P2 and 5-P3 are charts showing the histograms when the original is a positive film. These Figures are given for explaining the principle of the invention;

DESCRIPTION OF THE INVENTION

According to this invention, presence or absence of an image in one focus zone is discriminated or judged on the basis of the profile of a histogram which represents the number of picture elements in relation to the image signal value sensed by an image sensor. When it is judged that no image is present in one focus zone, a binarization level is set while making use of the histogram made for the aforementioned one focus zone. The reversing number in another focus zone is counted by binarizing the image signal of the another focus zone by the thus set binarization level to eliminate the necessity of making a new histogram for another focus zone.

Presence or absence of an image in a certain focus zone may be judged on the basis of the profile of the histogram either by a first or second method. In the first method, presence or absence of an image is judged on the basis of the distribution range of frequencies (indicated by the length along the abscissa of the histogram). In the second method, presence or absence of an image is judged on the basis of the maximum peak value in the histogram.

Principle of the Methods of the Invention:

The principles of the first and second methods will now be described in detail while referring to FIGS. 5-N1 to 5-N3 and FIGS. 5-P1 to 5-P3.

Figure 5:
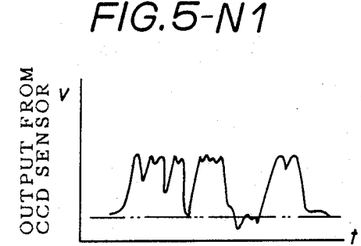

FIGS. 5-N1 and 5-P1 show changes in output signals V from the CCD sensor assembled in a microfilm reader-printer in terms of time t. FIGS. 5-N2 and 5-P2 are histograms corresponding, respectively, to FIGS. 5-N1 and 5-P1. FIGS. 5-N1 and 5-N2 show the wave form of output signal V and the corresponding histogram when the original is a negative film, whereas FIGS. 5-P1 and 5-P2 show the wave form of output signal V and the corresponding histogram when the original is a positive film.

The original has, in general, a blackening percentage of about 6%, the blackening percentage being up to 20 or 30% at the most. Accordingly, a preponderantly larger number of picture elements representing the background is sensed by a line sensor. The fluctuation of the background density is relatively little in one film or throughout one roll film, so that the output signal corresponding to the background density and fed from the line sensor is relatively stable. As a result, the histograms (see FIGS. 5-N2 and 5-P2) showing the numbers of picture elements n in the form of the frequency of output signals V (corresponding to densities D) have the maximum peak values A and B at the densities $D_1$ and $D_2$ indicating the background densities. In case where an image relevant for auto-focusing operation is not present in the sensed or scanned zone, the maximum peak value in the histogarm becomes exceedingly large. On the contrary, an image relevant for auto-focusing operation is present in the sensed or scanned zone, the maximum peak value in the histogram becomes relatively small and the distribution range of frequencies (indicated by the length along the abscissa of the histogram) is widened. Accordingly, it is possible to judge that an image is present when the length along the abscissa of the histogram (showing the distribution of output signals from the line sensor and also showing the distribution of densities of picture elements) is longer than a predetermined length $L_0$, and to judge that an image is not present in the scanned zone when the length along the abscissa of the histogram is shorter than $L_0$. Meanwhile, the area defined by the histogram curve and the abscissa is constant and corresponding to the number of picture elements sensed by the line sensor.

When the background density $D_1$ or $D_2$ and the binarization level a or b are determined from the histogram, it is desirous for improving the accuracy to utilize a portion of the histogram having a higher and narrower maximum peak A or B since such portion of the histogram corresponds to the area containing a large number of picture elements representing the background.

Accordingly, in the first method of this invention, presence or absence of an image in the scanned focus zone is judged on the basis of the distribution range along the abscissa of the histogram. More specifically, in the first method of this invention, the total length L of the output signal range where the frequency n of the histogram equal to or is more than a programmed value $x_0$ is determined, and then the length L is compared with a predetermined length $L_0$ to judge that an image is present in the scanned focus zone when L is equal to or longer than $L_0$. As an advantageous result, the time required for detecting an image, and hence the time required for auto-focusing operation, can be considerably decreased.

On the other hand, in the second method of this invention, presence or absence of an image in the scanned focus zone is judged on the basis of the maximum peak value of the histogram. In the second method, the following feature of the histogram is utilized. If an image relevant for auto-focusing operation is not present in the scanned focus zone, the maximum peak value of the histogram becomes higher; whereas the maximum peak value of the histogram becomes lower and the distribution range of frequencies in the histogram is widened if an image is present in the scanned focus zone. Making use of this feature of the histogram, according to the second method of this invention, the maximum peak value of the histogram is determined, and the maximum peak value is compared with a programmed value $x_1$ to judge that an image is present in the scanned focus zone when the maximum peak value is not higher than the programmed value $x_1$ and to judge that an image usable for auto-focusing operation is not present in the scanned focus zone when the maximum peak value is higher than the programmed value $x_1$.

When the total length L is less than the predetermined length $L_0$ in the first method or the maximum peak value of the histogram is more than the programmed value $x_1$ in the second method and it is thus judged that an image usable for auto-focusing operation is not present in the scanned focus zone, a binarization level a or b is set from the histogram for scanning another focus zone. It is hereby noted that the histogram for a zone containing no image has a higher and narrower maximum peak and is therefore suited for precise determination of the background density. As will be seen from FIG. 5-N3, when the original is a negative film, an image is present in the range representing the frequencies of picture elements having densities higher than the density $D_1$ of the maximum peak in the histogram. When the original is a positive film, it will be seen from FIG. 5-P3 that an image is present in the range representing the frequencies of picture elements having densities lower than the density $D_2$ of the maximum peak in the histogram. Accordingly, the binarization level a for a negative film is set by adding a constant $\alpha$ to the image signal value which is the larger one of the crossing points of the maximum peak curve of the histogram with a horizontal line indicating the programmed value $x_2$; whereas the binarization level b is set by subtracting a constant $\beta$ from the image signal value which is the smaller one of the crossing points of the maximum peak curve of the histogram with a horizontal line indicating the programmed value $x_2$.

First Embodiment

A first embodiment of this invention will now be described in detail with reference to FIGS. 1 to 4.

Figure 1:
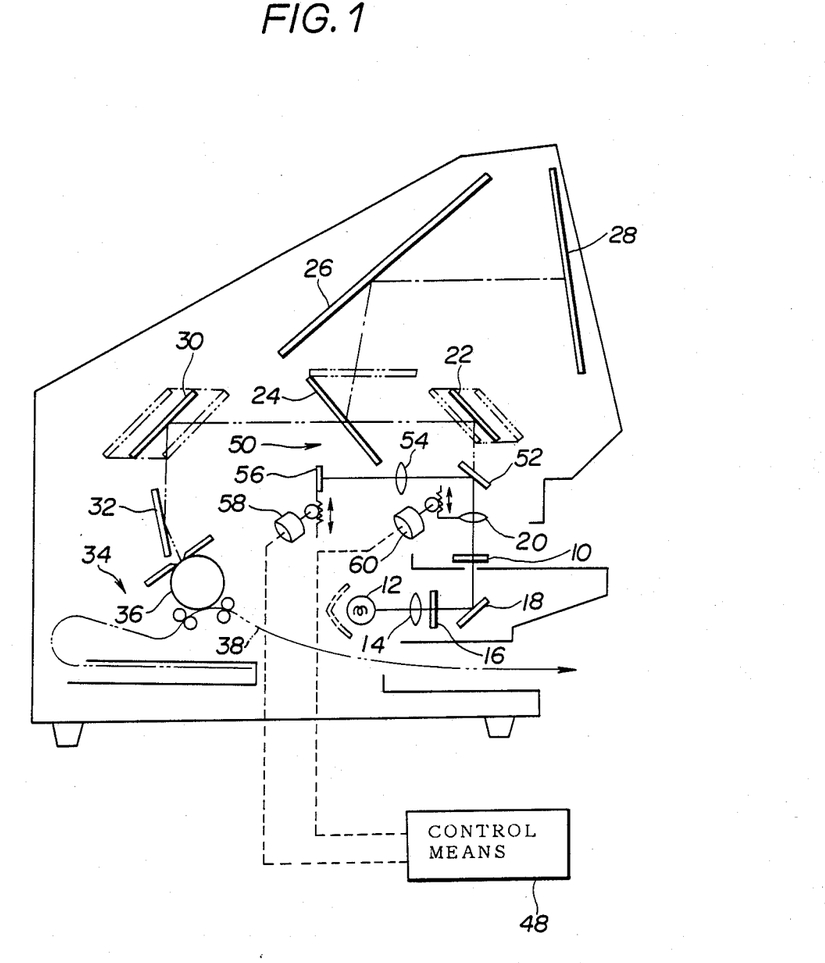
FIG. 1 is a schematic illustration showing a reader-printer in which a first embodiment of this invention is incorporated.
Figure 2:
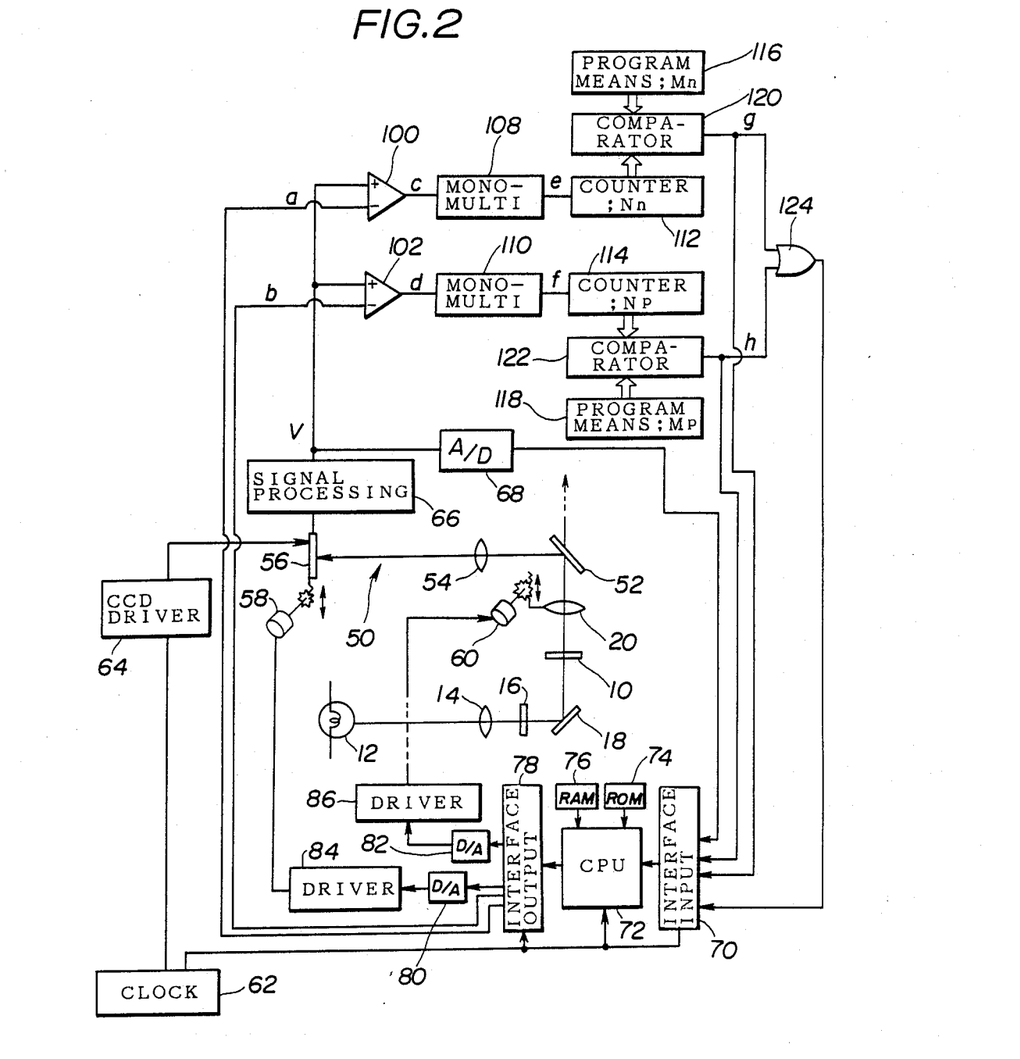
FIG. 2 is a block diagram showing a control system for the auto-focusing system incorporated in the reader-printer of FIG. 1.

Initially referring to FIGS. 1 and 2, reference numeral 10 designates an original in the form of a microfishe or a frame of a micro roll film. A light from a light source 12 passes through a condenser lens 14, a heat shield filter 16 and a reflector 18 onto the lower face of the original 10. In the reader mode use, the light transmitting through the original 10, i.e. the image projecting light, passes through a projection lens 20 and reflectors 22, 24 and 26 to a light-transmitting screen 28 on which an enlarged image of the original is focused.

In the printer mode use, the reflector 24 is moved to a position shown by dots-and-dash line in FIG. 1 so that the image projecting light is reflected by the reflectors 22, 30 and 32 to be projected on a surface of photosensitive recording means. In the illustrated example, the recording means is a slit exposure type printer 34 of PPC system. The printer 34 has a photosensitive drum 36 which is rotated in synchronism with the movements of the reflectors 22 and 30 so that a latent image is formed on the surface of the photosensitive drum 36. The thus formed latent image is developed by the use of a toner having a predetermined polarity, and the developed toner image is transferred onto a paper sheet 38.

A focus controlling optical system 50 comprises a half-mirror 52 disposed on the optical axis of the image projecting light, a projection lens 54, a CCD line sensor 56 used as an image sensor, and a servo motor 58. A portion of the image projecting light transmitting through the projection lens 20 is reflected by the half-mirror 52, and passes through the projection lens 54 to the line sensor 56. The line sensor 56 can be moved in the plane perpendicular to the optical axis of the image projecting light by means of the servo motor 58. The projection lens 54 has a focal distance so that a precisely focused image is incident upon the photosensitive surface of the line sensor 56 when the projection lens 20 is moved to the position at which a focused image projecting light is incident upon the screen 28 or upon the surface of the photosensitive drum 36.

The auto-focusing system in the illustrated embodiment has an additional servo motor 60 for moving the projection lens 20 in the direction parallel to the optical axis of the image projecting light, and the servo motor 60 is actuated by the control means 48 so that the image projecting light is precisely focused on the screen 28 or on the surface of the photosensitive drum 36.

The construction of the control means 48 is shown in FIG. 2. The line sensor 56 is actuated by a CCD driver 64 in synchronism with a clock pulse fed from a clock 62. The line sensor 56 generates, for every scanning operation, a series of output pulses having voltages varied in response to the incident light quantities from respective picture elements. The voltages of output pulses are varied due to the difference in characteristics of respective picture elements even when the light quantity of the projecting light is constant. The output pulses are processed by a signal processing circuit 66 to correct the difference in characteristics of respective picture elements and to be shaped into wave forms which are shown in FIGS. 5-N1 and 5-P1 as the output signals V.

Each of the output signals V processed by and fed from the signal processing circuit 66 is converted into a digital signal by an A/D converter 68, and then fed through an input interface 70 to a CPU (central processor unit) 72. The CPU 72 is connected with a ROM 74 for storing the control program for CPU 72 and other necessary data, a RAM 76 and an output interface 78. The output interface 78 is connected through a D/A converter 80 and a driver 84 to the servo motor 58, and also connected through a D/A converter 82 and a driver 60 to the servo motor 60.

Referring now to FIG. 2, comparators 100 and 102 are shown and have non-reverse input terminals for receiving output signals V and reverse input terminals for receiving the binarization levels a and b (see FIGS. 5-N3 and 5-P3), respectively for a negative film and for a positive film, calculated by the CPU 72. The outputs from these comparators 100 and 102 are in high levels as shown by c and d in FIG. 4 when V>a and V>b. A monostable multi-vibrator 108 generates constant width pulses e indicating reversion of the signal value from a level under the binarization level a to a level over the binarization level a in synchronism with the rise of the output pulses c from the comparator 100. Likewise, a monostable multi-vibrator 110 generates constant width pulses f indicating reversion of the signal value from a level under the binarization level b to a level over the binarization level b in synchronism with the rise of the output pulses d from the comparator 102. These pulses b or d are integrated by a counter 112 or 114 for every scanning operations by the line sensor 56. The result of integration by the counter 112 and 114 are reversing numbers $N_n$ and $N_p$ which are passed to comparators 120 and 122 where they are compared with programmed numbers $M_n$ and $M_p$ programmed by program means 116 and 118. If the reversing number $N_n$ is equal to or more than the programmed number $M_n$ or the reversing number $N_p$ is equal to or more than the programmed number $M_p$, it is judged that an image is present in the scanned zone. In such a case, the comparator 120 feeds a signal g of high level or the comparator 122 feeds a signal h of high level. It is desirous that the programmed numbers $M_n$ and $M_p$ are determined in consideration of the influences by the dusts or defects of the original 10. The signals g and h are fed in an OR circuit 124 which decides that an image relevant for auto-focusing operation is present upon receipt of either one of the signals g or h of high level to feed an information signal indicating the presence of such an image to the CPU 72, and simultaneously the signal g or h is passed to the CPU 72 by which it is judged whether the original is a negative film or a positive film depending on the receipt of signal g or signal h. When the signal g of high level is received, it is judged that the original is a negative film and thus the auto-focusing operation is performed by utilizing the binarization level a. When the signal h of high level is received, it is judged that the original is a positive film and thus the auto-focusing operation is performed by utilizing the binarization level b.

The operation of this embodiment will be described with reference to FIG. 3. The control means 48 controls the servo motor 58 so that the line sensor 56 receives light projecting through a focus zone addressed by the CPU 72. When the user selects the reader mode, the reflector 24 is moved to the position denoted by the real line in FIG. 1 so that the target original is projected on the screen 28 (Step 200 in FIG. 3). A portion of the light projecting through the original is reflected by the half-mirror 52 to be passed to the line sensor 56.

The control means 48 reads and stores the output signals V from the line sensor 56 (Step 202), and measures the exposure light quantity based on the output signals V (Step 204). In detail, the output signals V from the signal processing circuit 66 are passed through the input interface 70 to the CPU 72 which controls the exposure light quantity. When it is found by the Step 206 that the exposure light quantity is not appropriate, the exposure light quantity is varied (Step 208) and then the measurement of exposure light quantity is repeated. The exposure light quantity may be controlled by adjusting the light quantity from the light source 12 so that the output signal corresponding to the background picture element has a constant voltage.

Thereafter, the control means 48 judges whether or not an image relevant for auto-focusing operation is present in the zone scanned by the line sensor 56. Histograms shown in FIGS. 5-N2 and 5-P2 are made in relation of the output image signals V (Step 210), followed by determination of the total length L of the output signal range within which the frequency n along the ordinate of the histogram is more than a programmed value $x_0$, namely the range within which the picture elements have the densities higher than a threshold density corresponding to the programmed value $x_0$. The total length L is compared with a predetermined length $L_0$ (Step 212), and when L is longer than $L_0$ it is judged that an image relevant for auto-focusing operation is present in the scanned zone so that the control means 48 performs the auto-focusing operation (Step 216).

The auto-focusing operation may be controlled by various methods. For example, the position of the projection lens 20 for providing the maximum contrast is determined from the output image signals V to find the focused position (Step 218).

By selecting the printer mode while maintaining the system under the focused condition (Step 220), the reflector 24 swings to the position shown by the dots-and-dash line in FIG. 1 so that the image of the original can be transferred onto the paper sheet 38 to form a hard copy.

When it is found that the total length L is shorter than a predetermined length $L_0$ at the step 212, it is judged that an image relevant for auto-focusing operation is not present in the scanned zone. In such a case, the control means 48 sets the binarization level a for negative film or the binarization level b for positive film (Step 222) while making use of each histogram. As has been described hereinbefore, the binarization level a for negative film is set by adding a constant $\alpha$ to the image signal value which is larger one of the crossing points of the maximum peak curve of the histogram with a horizontal line indicating the programmed value $x_2$, and the binarization level b for positive film is set by subtracting a constant $\beta$ from the signal value which is the smaller one of the crossing points of the maximum peak curve of the histogram with a horizontal line indicating the programmed value $x_2$. The CPU 72 feeds a signal for actuating the servo motor 58 to move the line sensor 56, so that the zone to be scanned by the line sensor 56 is shifted to a second focus zone (Step 224). The second focus zone is then scanned, and output image signals V generating as the result of scanning the second focus zone are binarized by a real time processing (Step 226), and the reversing numbers $N_n$ and $N_p$ are integrated, respectively, by the counters 112 and 114 (Step 228). When the integrated reversing number $N_n$ is larger than the programmed value $M_n$, a signal g of high level indicating the presence of an image is fed from the comparator 120 to the OR circuit 124 and to the CPU 72; and when the integrated reversing number $N_p$ is larger than programmed value $M_p$, a signal h of high level indicating the presence of an image is fed from the comparator 122 to the OR circuit 124 and to the CPU 72 (Step 230). When both of the signals g and h are not of high level so that the output from the OR circuit 124 is of low level, the CPU 72 judges that an image relevant for auto-focusing operation is not present in the second focus zone. In such a case, a signal for shifting the line sensor 56 to scan a new third zone is generated from the CPU 72, and the operation sequence of Step 226 to Step 230 will be repeated. When either one of the signals g or h is of high level, it is judged that an image relevant for auto-focusing operation is present (Step 214), and then the control means 48 performs the auto-focusing operation (Steps 216 and 218). By selecting the printer mode while maintaining the system under the focused condition, a hard copy may be reproduced (Step 220).

In the embodiment described above, since the binarization level a for negative film and the binarization level b for positive film are set and the output signal value are simultaneously binarized by both of the binarization levels a and b to determine the reversing number $N_p$ and $N_p$ respectively for the negative and positive films, either one of the signals g or h is of high level is supplied to the CPU 72 to enable to find whether the original is a negative film or a positive film. However, within the scope of this invention, it is possible to set the system suited for using either one of the negative or positive films manually by pushing a selection button on the operation console so that the output image signal is binarized only by the selected one of the binarization levels a or b.

The image sensor used in this invention should not be necessarily limited to a CCD line sensor, but sensors of other type such as, a MOS type line sensor or an area sensor, may also be used in this invention.

Figure 6:
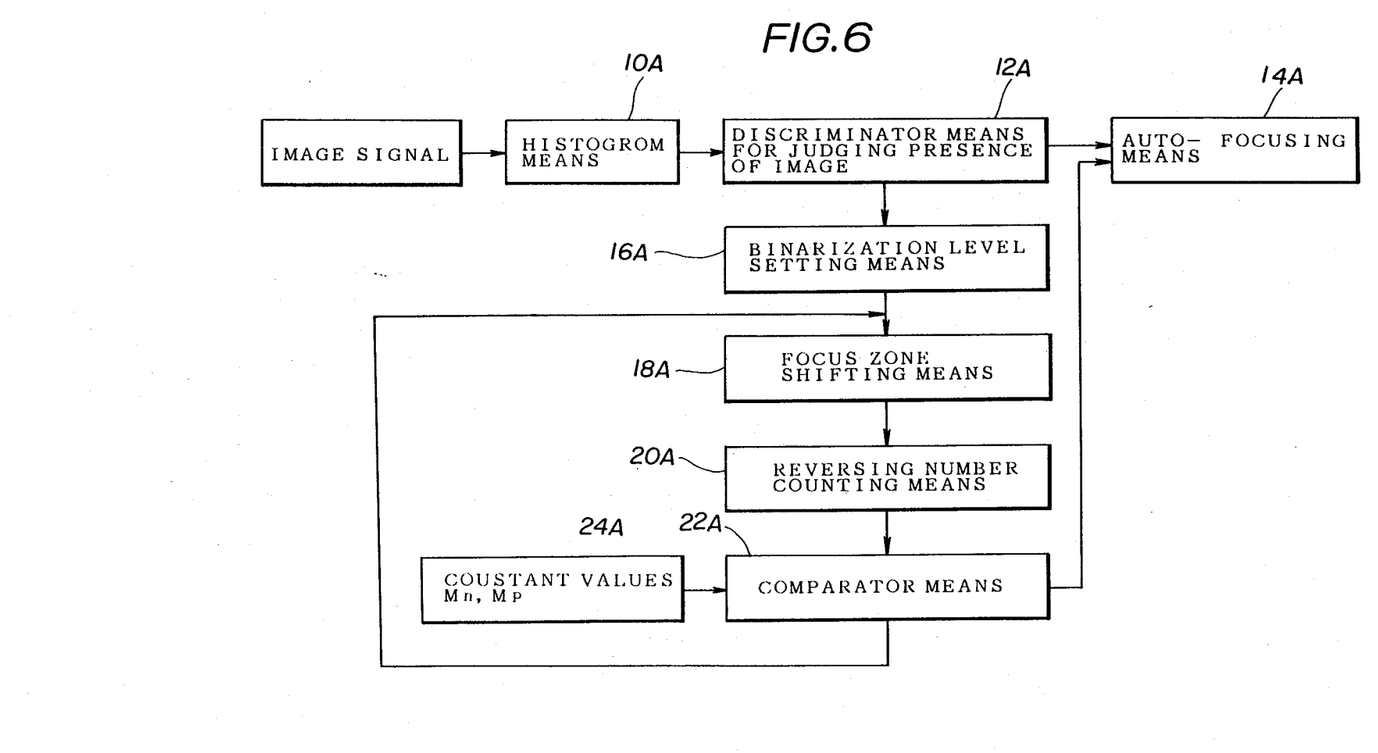
FIG. 6. is a block diagram showing the operation sequence of the first embodiment of the image detecting device of the invention.
Figure 7:
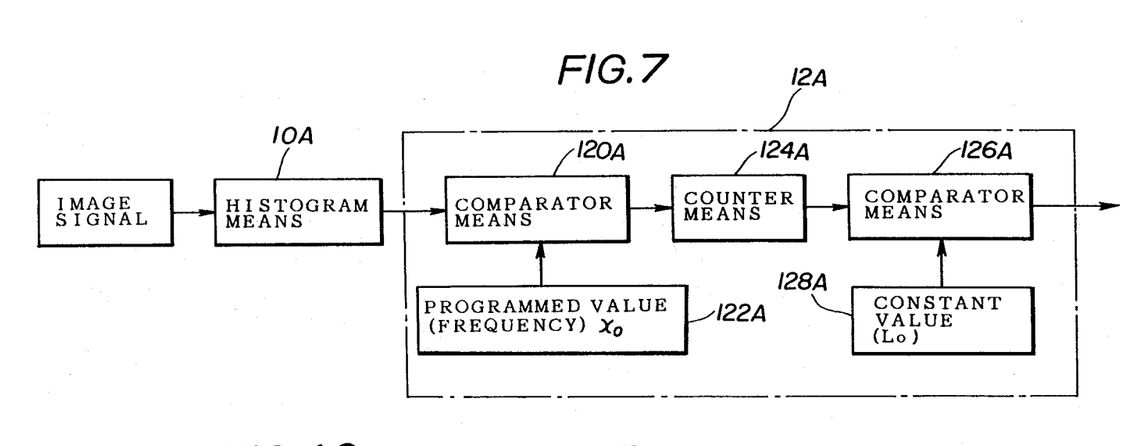
FIG. 7 is a block diagram showing the operation sequence of an embodiment of the discriminator means for discriminating presence or absence of image.
Figure 8:
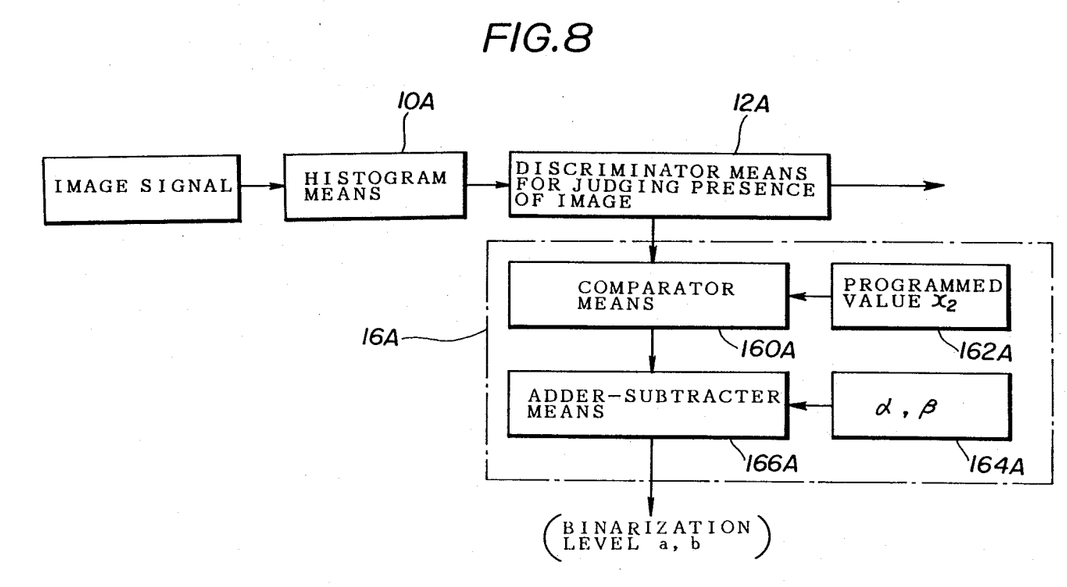
FIG. 8 is a block diagram showing the operation sequence of an embodiment of the binarization level setting means.

The present invention will now be described more specifically by referring to FIGS. 6 to 8 in which: FIG. 6 is a block diagram showing the operation sequence of an embodiment of the image detecting device of the invention; FIG. 7 is a block diagram showing the operation sequence of an embodiment of the discriminator means for discriminating presence or absence of image; FIG. 8 is a block diagram showing the operation sequence of an embodiment of the binarization level setting means.

Figure 3A:
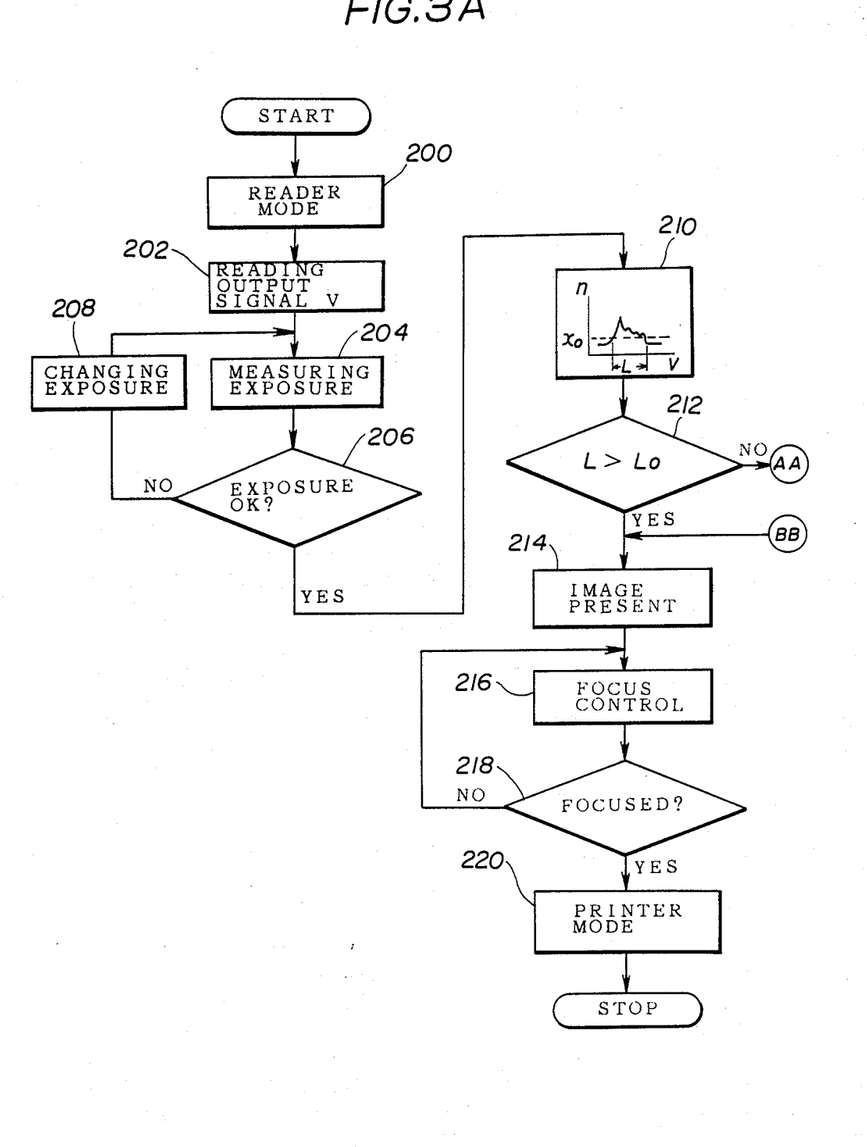
FIGS. 3A, 3B are flow charts showing the processing sequence of the first embodiment of the auto-focusing system.
Figure 3B:
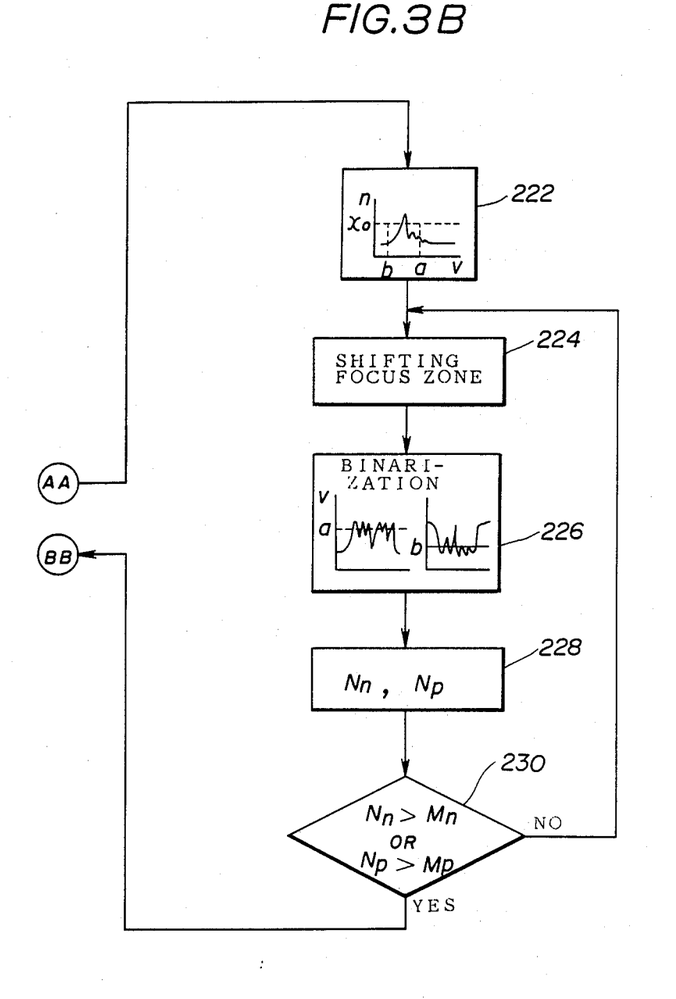
Figure 4:
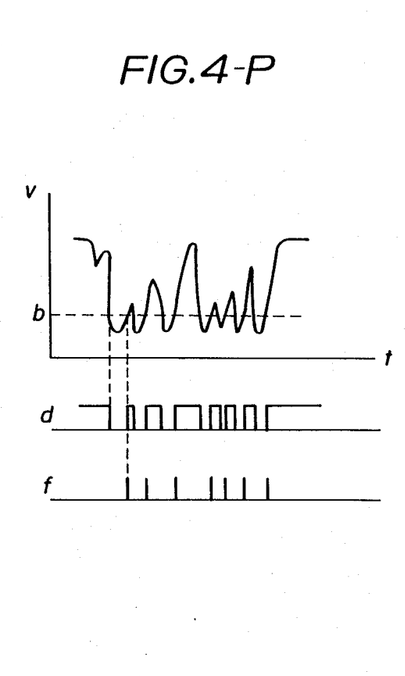

In these Figures, a histogram means is denoted by 10A which performs the function or operation of Step 210(see FIG. 3). Reference numeral 12A designates a discriminator means for judging presence or absence of an image in the scanned zone and performs the function or operation shown by the block diagram encircled by the dot-and-dash lines in FIG. 7. Referring to FIG. 7, the discriminator means 12A comprises a program means 122A for setting the programmed value $x_0$ which is fed to a comparator means 120A. The levels of the image signals are compared with the programmed value $x_0$ by the comparator means 120A and the results of comparison are fed to a counter 124A to know the total length L indicating the range where the frequency n of the histogram is more than the programmed value $x_0$. In a comparator means 126A, the total length L is compared with a predetermined length $L_0$ fed from a program means 128A to the comparator means 126A. Presence or absence of an image in the scanned zone is judged depending on the result of comparison between L and $L_0$ (Step 212 shown in FIG. 3).

When it is judged that an image is present in the scanned zone, auto-focusing operation is performed by an auto-focusing means 14A (see FIG. 6). When it is judged that an image relevant for auto-focusing operation is not present in the scanned zone, the binarization levels a and b are set by a binarization level setting means 16A. This means 16A comprises a comparator means 160A and an adder-subtracter means 166A as shown in FIG. 8. A programmed value $x_2$ is fed from a program means 162A to the comparator means 160A. Data of the maximum peak curve of the histogram are fed to the comparator means 160A and compared with the programmed value $x_2$ to find the output signal values corresponding to the crossing points of the curve with a line indicating the programmed value $x_0$. A constant $\alpha$ is added to the output signal value corresponding to the larger one of the crossing points to set the binarization level a; and a constant $\beta$ is subtracted from the output signal value corresponding to the smaller one of the crossing points to set the binarization level b (Step 222 shown in FIG. 3). Constants $\alpha$ and $\beta$ are predetermined by a programmed means 164A.

Reference numeral 18A designates a focus zone shifting means which comprises a servo motor 58 for moving the line sensor 56 of the focus controlling optical system 50. When the focus zone is shifted by the means 18A., the reversing numbers $N_n$ and $N_p$ are detected by a reversing number counting means 20A in which the output signal values from the line sensor 56 are binarized by the binarization levels a and b.

Reference numeral 22A designates a further comparator means for comparing the reversing number $N_n$ with the constant value $M_n$ and for comparing the reversing number $N_p$ with the constant value $M_p$ to judge the presence or absence of an image relevant for auto-focusing operation in the scanned zone. When the comparator means 22A judges that an image relevant for auto-focusing operation is present, a signal for commencing the auto-focusing operation is fed therefrom. Constant values $M_n$ and $M_p$ are fed from program means 24A.

Second Embodiment

The operation of a second embodiment will now be described with reference to FIG. 9. The second embodiment is distinctive from the first embodiment in the operation of CPU 72, particularly the operation for discriminating presence or absence of an image from the histograms in the second embodiment is different from that in the first embodiment. However, since the construction of hardware used in the second embodiment is the same as used in the first embodiment and shown in FIGS. 1 and 2, the description of the hardware used in the second embodiment will not be repeated. Likewise, since the steps 200 to 208 are the same as described with reference to FIG. 3, the description thereof will not be repeated here.

Figure 9A:
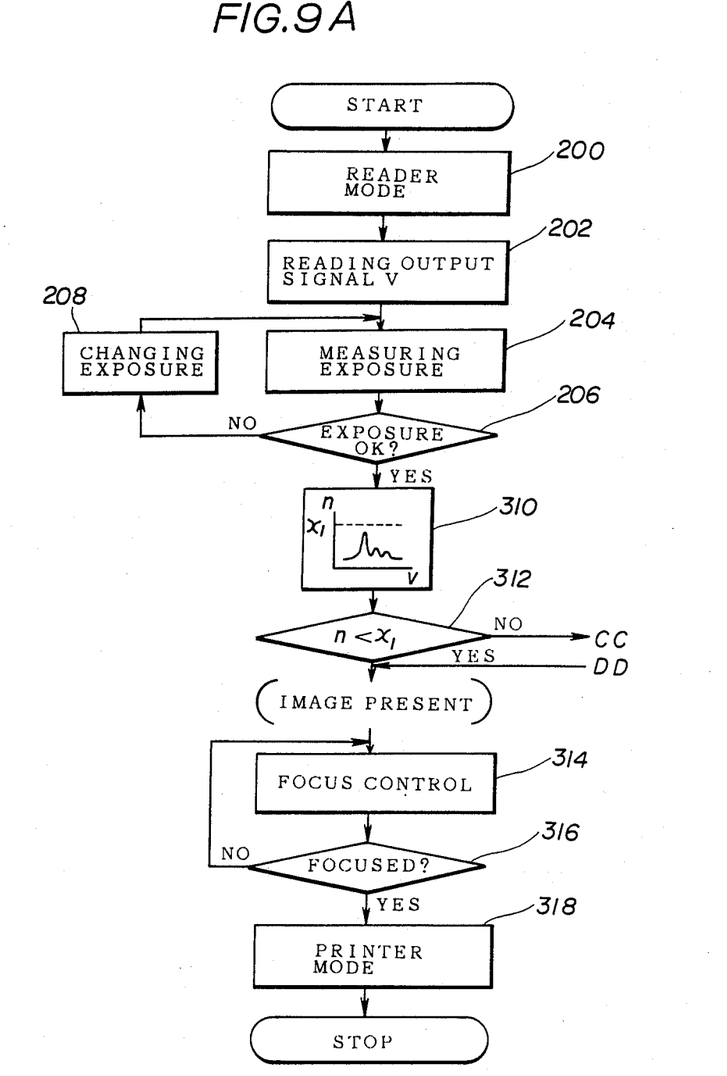
FIGS. 9A, 9B are flow charts showing the operation sequence of a second embodiment of the auto-focusing system.
Figure 9B:
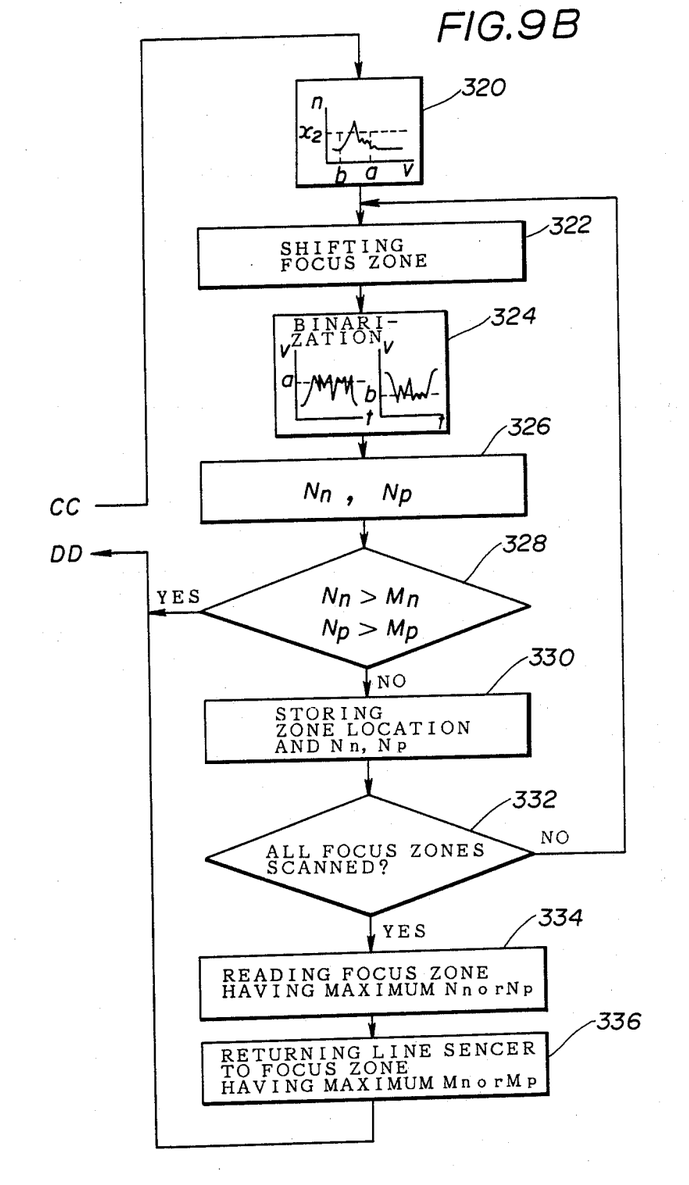

Now referring to FIG. 9, after the completion of adjustment of exposure light quantity by the steps 200 to 208, presence or absence of an image in the scanned zone is judged by the control means 48 based on the principle as described hereinbefore as the second method. The histograms shown in FIGS. 5-N2 and 5-P2 are made, and the maximum peak values thereof are compared with the programmed value $x_1$ (Step 310). When either one of the maximum peak values of the histograms is lower than the programmed value $x_1$, it is judged that an image relevant for auto-focusing operation is present in the scanned focus zone (Step 312) and the control means 48 performs the auto-focusing operation (Step 314). After confirming that the image is brought to the focused condition (Step 316) and the user selects the printer mode (Step 318), a hard copy is reproduced.

When it is found that both of the maximum peak values of the histograms are higher than the programmed value $x_1$ at the step 312, it is judged that an image relevant for auto-focusing operation is not present in the scanned focus zone. In such a case, binarization levels a for negative film and b for positive film are set from the histograms by the control means 48 (Step 320). The binarization level a for negative film is set by adding a constant α to the signal value which is the larger one of the crossing points of the maximum peak curve of the histogram with a horizontal line indicating the programmed value $x_2$; and the binarization level b for positive film is set by subtracting a constant β from the smaller one of the crossing points of the maximum peak curve of the histogram with a horizontal line indicating the programmed value $x_2$.

After setting the binarization level a or b (Step 320), the CPU 72 generates a signal for actuating the servo motor 58 to move the line sensor 56 so that a new focus zone is selected (Step 322). The output signals V obtained by scanning the new focus zone are binarized by the binarization level a or b by a real-time operation (Step 324), and the reversing number $N_n$ or $N_p$ is integrated by the counter 112 or 114 (Step 326). In the Step 328, when the integrated reversing number $N_n$ is equal to or larger than the programmed value $M_n$, a signal g of high level is fed from the comparator 120 to the OR circuit 124 and the CPU 72 to indicate the presence of a negative image; and when the integrated reversing number $N_p$ is equal to or larger than the programmed value $M_p$, a signal h of high level is fed from the comparator 122 to the OR circuit 124 and the CPU 72 to indicate the presence of positive image. When both of the signals g and h are not in high level, the output from the OR circuit 124 is of low level to indicate that an image relevant for auto-focusing operation is not present in the scanned new focus zone. The reversing numbers $N_n$ and $N_p$ are stored in the RAM 76 together with the positional data of the new focus zone. Then, the line sensor 56 is moved to scan a further different focus zone, and the operations of Steps 322 to 330 are repeated until a focus zone containing an image relevant for auto-focusing operation is found. A focus zone containing an image relevant for auto-focusing operation is discriminated by finding that either one of the signals g or h is of high level at the Step 328. After finding a focus zone containing an image relevant for auto-focusing operation, the control means 48 generates signals for commencing the auto-focusing operation (Steps 314 and 316).

In case where both of the signals g and h are not of high level in all of the scanned focus zones (Step 332), the CPU 72 reads the data of $N_n$ and $N_p$ stored in the RAM 76 to find the location of the focus zone having the maximum $N_n$ or $N_p$ (Step 334). The line sensor 56 is moved to scan the focus zone having the maximum $N_n$ or $N_p$ in response to the instruction from the CPU 72 (Step 336), and then control means 48 generates signals for commencing the auto-focusing operation (Steps 314 and 316). By selecting the printer mode use under the focused condition, a hard copy may be reproduced (Step 318).

Figure 10:
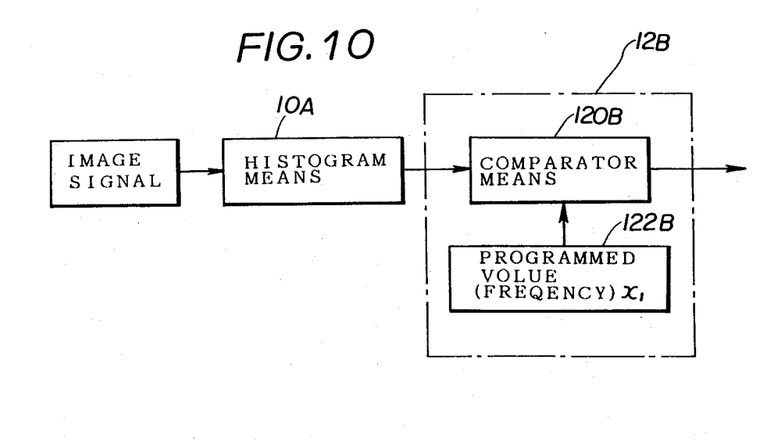
FIG. 10 is a block diagram showing the operation sequence of the discriminator means 12B of the second embodiment for discriminating presence or absence of image.

The operation sequence of a discriminator means 12B used for discriminating presence or absence of an image in the second embodiment will now be described with reference to FIG. 10. The discriminator means 12B comprises a comparator means 120B for comparing the maximum peak values of the histograms with the programed value $x_1$ which is fed from a program means 122B. The constructions and operations of the image detecting device and the binarization setting means combined with the discriminator means 12B and used in the second embodiment are similar to those used in the first embodiment and shown FIGS. 6 and 8, and it is believed that a person having ordinary skill in the art can readily understand the constructions and operations thereof without any further explanation.

As will be understood from the foregoing, in the method of this invention, one focus zone is scanned by an image sensor and a histogram is made in relation of the image signal values sensed by the image sensor. Presence or absence of an image relevant for auto-focusing operation in the scanned one focus zone is judged initially on the basis of the profile of the histogram. When it is judged that an image relevant for auto-focusing operation is not present in the one focus zone, a binarization level is set from the histogram made for the one focus zone. Another focus zone is then scanned and presence or absence of an image relevant for auto-focusing operation in the another focus zone is judged by a real time operation. In detail, the image signal values of the another focus zone are binarized using the binarization level set for the one focus zone to know the reversing number N of which the image signal of another focus zone changes from a value over/under the binarization level to a value over/under the binarization level. Presence or absence of an image in the another focus zone is judged by comparing the reversing number with a programmed number M. It is not necessary to make a histogram for the another focus zone to save time for finding a focus zone containing an image relevant for subsequent auto-focusing operation. The method of the present invention may be used irrespective of whether the original is a negative film or a positive film. A further advantage of the invention is that the image detecting operation is performed with high accuracy without being affected by the fluctuation in background density of the original.

What is claimed is:

1. In the method of detecting an image in an auto-focusing apparatus in which a projection lens is controlled to focus the image by scanning the light projecting through the original image with an image sensor and by utilizing the image signals generated from said image sensor, an improvement which comprises:
   (a) the step of making a histogram which represents the number of picture elements in relation of the image signal values sensed by said image sensor in one focus zone;
   (b) the step of judging whether or not an image is present in said one focus zone on the basis of a profile of said histogram;
   (c) the step of setting a binarization level using said histogram when it is judged that no image is present at the preceding step (b);
   (d) the step of counting the reversing number N of which the image signals of another focus zone change from a value under/over said binarization level to a value over/under said binarization level; and
   (e) the step of judging that an image is present in said another focus zone when the image reversing number N counted at the preceding step (d) is equal to or more than a programmed number M.

2. The method of detecting an image as claimed in claim 1, wherein said step (b) is the step of determining the total length L of the output signal range where the frequency n of the histogram is more than the programmed value $x_0$, and comparing the length L with a predetermined length $L_0$ to judge that an image is present in said one focus zone when L is longer than $L_0$.

3. The method of detecting an image as claimed in claim 1, wherein said step (b) is the step of determining the maximum value of said histogram and comparing said maximum value with a programmed value $x_1$ to judge that an image is present in said one focus zone when said maximum value is not higher than said programmed value $x_1$.

4. The method of detecting an image as claimed in claim 1, wherein said step (c) is the step of setting a level a for negative film by adding a constant $\alpha$ to the image signal value which is the larger one of the crossing points of the maximum peak curve of the histogram with a horizontal line indicating a programmed value $x_2$, and setting another level b for positive film by subtracting a constant $\beta$ from the image signal value which is the smaller one of the crossing points of a maximum peak curve of the histogram with a horizontal line indicating a programmed value $x_2$.

5. The method of detecting an image as claimed in claim 4, wherein said image signals of said another focus zone are compared with respective binarization levels a and b for the negative and positive films set by said preceding claim 4, followed by separate integration of the reversing numbers $N_n$ and $N_p$ respectively for the negative and positive films, and it is judged that an image is present in said another focus zone when the result of integration of the reversing number $N_n$ is larger than a programmed values $M_n$ or when the result of integration of the reversing number $N_p$ is larger than a programmed value $M_p$.

6. An image detecting device to be assembled in an auto-focusing apparatus in which a projection lens is controlled to focus the image by scanning the light projecting through the original image with an image sensor and by utilizing the image signals generated from said image sensor, an improved image detecting device which comprises: (a) histogram means for making a histogram which represents the number of picture elements in relation of the image signal value sensed by said image sensor in one focus zone;
(b) discriminator means for judging the presence or absence of an image in said one focus zone on the basis of a profile of said histogram;
(c) focus zone shifting means for shifting the focus zone from said one focus zone to another focus zone when said discriminator means judges that no image is present;
(d) binarization level setting means for setting a binarization level using said histogram;
(e) reversing number counting means for counting the reversing number N of which the image signals of another focus zone change from a value under-/over said binarization level to a value over/under said binarization level; and
(f) comparator means for comparing said reversing number N with a programmed number N; said image detecting device judging that an image is present when said reversing number N is more than said programmed number N.

7. The image detecting device according to claim 6, wherein said discriminator means comprises comparator means for comparing said histogram with a constant frequency $x_0$, counter means for determining the total length L of the image signal level where said histogram takes a value higher than said constant frequency $x_0$, and comparator means for comparing said total length L with a predetermined length $L_0$ to judge that an image is present in said one focus zone when said total length L is longer than said predetermined length $L_0$.

8. The image detecting device according to claim 6, wherein said discriminator means comprises comparator means for comparing the maximum value of said histogram with a predetermined frequency $x_1$ to judge that an image is not present in said one focus zone when said maximum value is more than said predetermined frequency $x_1$.

9. The image detecting device according to claim 6, wherein said binarization level setting means comprises comparator means for comparing two output levels where the maximum peak value of said histogram crosses with a programmed value $x_2$, and adder means for adding a constant value $\alpha$ to the larger output level to set a binarization level a for a negative film.

10. The image detecting device according to claim 6, wherein said binarization level setting means comprises comparator means for comparing two output levels where the maximum peak curve of said histogram crosses with a programmed value $x_2$, and subtracter means for subtracting a constant value $\beta$ from the smaller output level to set a binarization level b for a positive film.

* * * * *